(12) United States Patent
Telfer et al.

(10) Patent No.: US 10,209,530 B2
(45) Date of Patent: Feb. 19, 2019

(54) THREE-DIMENSIONAL DISPLAY (71) Applicant: E INK CORPORATION, Billerica, MA (US)

(72) Inventors: Stephen J. Telfer, Arlington, MA (US); Stephen Bull, Windham, NH (US)

(73) Assignee: E Ink Corporation, Billerica, MA (US)

(*) Notice: Subject to any disclaimer, the term of this patent is extended or adjusted under 35 U.S.C. 154(b) by 42 days.

(21) Appl. No.: 15/370,627

(22) Filed: Dec. 6, 2016

(65) Prior Publication Data
US 2017/0160556 A1 Jun. 8, 2017

Related U.S. Application Data

(60) Provisional application No. 62/264,293, filed on Dec. 7, 2015.

(51) Int. Cl.
| | | |
|---|---|---|
| *G02B 26/00* | (2006.01) | |
| *F21V 8/00* | (2006.01) | |
| *G09G 3/34* | (2006.01) | |
| *G02B 27/01* | (2006.01) | |
| *G02B 27/22* | (2018.01) | |
| *G02F 1/167* | (2006.01) | |
| *H04N 13/388* | (2018.01) | |

(52) U.S. Cl.
CPC ....... *G02B 27/2242* (2013.01); *G02B 6/0035* (2013.01); *G02B 26/005* (2013.01); *G02B 27/0101* (2013.01); *G02F 1/167* (2013.01); *G09G 3/344* (2013.01); *G09G 3/348* (2013.01); *H04N 13/388* (2018.05); *G02B 2027/0134* (2013.01); *G02F 2001/1676* (2013.01); *G02F 2203/023* (2013.01)

(58) Field of Classification Search
CPC .............. G02B 27/2242; G02B 6/0035; G02B 26/005; G02F 1/167; G09G 3/344; G09G 3/348
USPC ........ 359/237–240, 242, 245–246, 250–252, 359/265–271, 290–298; 349/38–40
See application file for complete search history.

(56) References Cited

U.S. PATENT DOCUMENTS

| | | |
|---|---|---|
| 5,317,667 A | 5/1994 | Ford |
| 5,812,186 A | 9/1998 | Telfer |
| 6,064,784 A | 5/2000 | Whitehead |
| 6,118,426 A | 9/2000 | Albert |
| 6,241,921 B1 | 6/2001 | Jacobson |

(Continued)

FOREIGN PATENT DOCUMENTS

| | | |
|---|---|---|
| GB | 2404448 A | 2/2005 |
| WO | 2000036560 | 6/2000 |

(Continued)

OTHER PUBLICATIONS

Hayes, R.A., et al.,"Video-Speed Electronic Paper Based on Electrowetting", Nature, vol. 425, Sep. 25, pp. 383-385 (2003) Sep. 25, 2003.

(Continued)

*Primary Examiner* — William R Alexander
*Assistant Examiner* — Tamara Y. Washington
(74) *Attorney, Agent, or Firm* — David J. Cole (57) ABSTRACT

Three-dimensional displays are described using electrophoresis or electro-wetting media to modulate the total internal reflection of light in a waveguide.

15 Claims, 4 Drawing Sheets

(56) References Cited

U.S. PATENT DOCUMENTS

| | | |
|---|---|---|
| 6,473,072 B1 | 10/2002 | Comiskey |
| 6,672,921 B1 | 1/2004 | Liang |
| 6,704,133 B2 | 3/2004 | Gates |
| 6,710,540 B1 | 3/2004 | Albert |
| 6,738,050 B2 | 5/2004 | Comiskey |
| 6,784,953 B2 | 8/2004 | Liang |
| 6,788,449 B2 | 9/2004 | Liang |
| 6,795,138 B2 | 9/2004 | Liang |
| 6,819,471 B2 | 11/2004 | Amundson |
| 6,822,782 B2 | 11/2004 | Honeyman |
| 6,825,829 B1 | 11/2004 | Albert |
| 6,866,760 B2 | 3/2005 | Paolini, Jr. |
| 6,914,713 B2 | 7/2005 | Chung |
| 6,922,276 B2 | 7/2005 | Zhang et al. |
| 6,950,220 B2 | 9/2005 | Abramson et al. |
| 6,961,167 B2 | 11/2005 | Prins et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner |
| 7,030,854 B2 | 4/2006 | Baucom et al. |
| 7,072,095 B2 | 7/2006 | Liang |
| 7,075,502 B1 | 7/2006 | Drzaic |
| 7,095,477 B2 | 8/2006 | Liang |
| 7,116,318 B2 | 10/2006 | Amundson et al. |
| 7,119,759 B2 | 10/2006 | Zehner et al. |
| 7,144,942 B2 | 12/2006 | Zang |
| 7,170,670 B2 | 1/2007 | Webber |
| 7,182,830 B2 | 2/2007 | Liang |
| 7,230,750 B2 | 6/2007 | Whitesides |
| 7,245,414 B2 | 7/2007 | Liang |
| 7,312,784 B2 | 12/2007 | Baucom et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson |
| 7,453,445 B2 | 11/2008 | Amundson |
| 7,471,369 B2 | 12/2008 | Liang |
| 7,535,624 B2 | 5/2009 | Amundson et al. |
| 7,576,904 B2 | 8/2009 | Chung |
| 7,580,180 B2 | 8/2009 | Ho |
| 7,615,325 B2 | 11/2009 | Liang |
| 7,679,814 B2 | 3/2010 | Paolini, Jr. et al. |
| 7,705,824 B2 | 4/2010 | Baucom et al. |
| 7,715,088 B2 | 5/2010 | Liang |
| 7,839,564 B2 | 11/2010 | Whitesides et al. |
| 7,850,867 B2 | 12/2010 | Liang |
| 8,009,348 B2 | 8/2011 | Zehner |
| 8,011,592 B2 | 9/2011 | Wang |
| 8,018,643 B2 | 9/2011 | Ho |
| 8,023,071 B2 | 9/2011 | Liang |
| 8,064,962 B2 | 11/2011 | Wilcox et al. |
| 8,162,212 B2 | 4/2012 | Chung |
| 8,282,762 B2 | 10/2012 | Liang |
| 8,319,759 B2 | 11/2012 | Jacobson |
| 8,553,012 B2 | 10/2013 | Baucom |
| 8,786,643 B2 | 7/2014 | Seetzen |
| 8,973,837 B2 | 3/2015 | Tsai |
| 8,994,705 B2 | 3/2015 | Jacobson |
| 9,188,829 B2 | 11/2015 | Li |
| 9,197,704 B2 | 11/2015 | Sun |
| 9,201,270 B2 | 12/2015 | Fattal et al. |
| 9,279,906 B2 | 3/2016 | Kang |
| 2002/0090980 A1 | 7/2002 | Wilcox et al. |
| 2004/0119681 A1 | 6/2004 | Albert et al. |
| 2007/0205979 A1 | 9/2007 | Bigelow |
| 2007/0285385 A1 | 12/2007 | Albert |
| 2008/0020007 A1 | 1/2008 | Zang |
| 2012/0092395 A1* | 4/2012 | Seetzen ............ G02F 1/133615 345/690 |
| 2012/0293858 A1 | 11/2012 | Telfer |
| 2013/0176288 A1 | 7/2013 | Hung |
| 2013/0221112 A1 | 8/2013 | Lai |
| 2013/0235536 A1 | 9/2013 | Cheng |
| 2014/0049808 A1 | 2/2014 | Yang |
| 2014/0062391 A1 | 3/2014 | Hsieh |
| 2014/0070119 A1* | 3/2014 | Huang ............... G02B 6/03666 250/515.1 |
| 2014/0206292 A1 | 7/2014 | Hung |
| 2014/0300840 A1* | 10/2014 | Fattal ............... G02F 1/133615 349/15 |
| 2015/0005720 A1 | 1/2015 | Zang |
| 2015/0277160 A1 | 10/2015 | Laxton |
| 2016/0012710 A1 | 1/2016 | Lu |
| 2016/0035291 A1 | 2/2016 | Hung |
| 2016/0246155 A1* | 8/2016 | Loxley .................... G02F 1/167 |

FOREIGN PATENT DOCUMENTS

| | | |
|---|---|---|
| WO | 2000075720 | 12/2000 |
| WO | 2015116086 A1 | 8/2015 |

OTHER PUBLICATIONS

Korean Intellectual Property Office; PCT/US2016/065258; International Search Report and Written Opinion; dated Apr. 27, 2017. Apr. 27, 2017.

European Patent Office, EP Appl. No. 16873707.0, European Search Report, dated Oct. 31, 2018.

* cited by examiner

THREE-DIMENSIONAL DISPLAY

REFERENCE TO RELATED APPLICATIONS

This application claims benefit of application Ser. No. 62/264,293, filed Dec. 7, 2015.

The entire contents of this copending application, and of all other U.S. patents and published and copending applications mentioned below, are herein incorporated by reference.

BACKGROUND OF INVENTION

This invention relates to three-dimensional displays; more specifically, this invention relates to such displays that use electro-optic media to modulate the passage of light along a waveguide.

Most displays (using "displays" in a broad sense to include fixed images on paper or similar materials) are two-dimensional, and use of such two-dimensional images to construct real three-dimensional objects can lead to difficulties. For example, many people have trouble envisioning the final appearance of a three-dimensional object from a set of two-dimensional images, and it may be difficult to detect awkward relative placements of objects or awkward sightlines from two-dimensional images. Hence, it is useful to represent three-dimensional objects in such a way that the spatial relationships between the various components of the objects are apparent. Three-dimensional displays are known; for example, three-dimensional displays which include waveguides based on liquid crystal (LCD) technology have been described, for example in U.S. Pat. No. 5,812,186. However, liquid crystalline materials may introduce an angular dependence of light modulation which can limit the performance of such three-dimensional displays, for example, by sacrificing how the object is viewed from certain perspectives.

It is known that modulation of light travelling along optical fibers can be effected by so-called "frustrated internal reflection" where internal reflection at the surface of a waveguide is prevented by bringing a material of relatively high refractive index adjacent a surface of the waveguide; see for example U.S. Pat. No. 5,317,667.

It has now been realized that three-dimensional displays which do not suffer from the known disadvantages of three-dimensional liquid crystal displays can be constructing using electrophoretic and other electro-optic media.

SUMMARY OF INVENTION

Accordingly, this invention provides a three-dimensional display comprising: a waveguide having first and second ends and configured such that light enters through the first end and propagates through the waveguide toward the second end, the waveguide having a planar face intermediate the first and second ends; an electrophoretic modulating element disposed adjacent the planar face and comprising a fluid in which electrically-charged particles are dispersed, the electrophoretic modulating element comprising a plurality of pixels disposed at differing distances from the second end of the waveguide, the particles at each pixel being movable between a first position adjacent the planar surface, thereby causing light absorption and/or light scattering at the pixel, and a second position spaced from the planar surface, thereby permitting propagation of light along the waveguide; and a driving means configured to control the electric field applied to each pixel independently. The pixels create image points that form a three-dimensional image to a viewer looking through the second end of the waveguide.

In this display, the electrically charged particles and the fluid may be confined within a plurality of capsules or microcells, or may be present as a plurality of discrete droplets surrounded by a continuous phase comprising a polymeric material. The microcells may be delimited by the planar surface, a surface of a substrate co-planar with the planar surface and sidewalls that extend between the planar surface and the surface of the substrate. Each microcell may comprise a first electrode on the planar surface of the waveguide and a second electrode on the surface of the substrate. The display may comprise a plurality of waveguides and a plurality of modulating elements each coupled to one associated waveguide. The fluid may have a lower refractive index than the waveguide and the electrically-charged particles may have a refractive index equal to or greater than the waveguide.

This invention also provides a three-dimensional display comprising: a waveguide having first and second ends and configured such that light enters through the first end and propagates through the waveguide toward the second end, the waveguide having a planar face intermediate the first and second ends; an electrowetting modulating element disposed adjacent the planar face and comprising a plurality of pixels disposed at differing distances from the second end of the waveguide, each pixel comprising at least one fluid droplet movable between a first position causing light absorption and/or light scattering at the pixel, and a second position permitting propagation of light along the waveguide; and a driving means configured to control the electric field applied to each pixel independently. The pixels create image points that form a three-dimensional image to a viewer looking through the second end of the waveguide.

In such a display, the fluid droplets may comprise a first fluid and each pixel may further comprise a second fluid immiscible with the first fluid. The fluid droplets may be confined within a plurality of microcells, which may be delimited by the planar surface of the waveguide, a surface of a substrate co-planar with the planar surface and sidewalls that extend between the planar surface and the surface of the substrate. Each microcell may comprise a first electrode on the planar surface and a second electrode on the surface of the substrate. The display may comprise a plurality of waveguides and a plurality of modulating elements each coupled to one associated waveguide.

DETAILED DESCRIPTION

As already noted, this invention relates to three-dimensional displays. The displays of this invention include at least one waveguide through having first and second ends and configured such that light enters through the first end and propagates through the waveguide toward the second end. The total internal reflection ("TIR") of the propagating light within the waveguide may be disrupted ("frustrated") by a modulating element at selected locations along the waveguide at differing distances from the second end thereof. These disruptions produce image points that form a three-dimensional image to a viewer looking through the second end of the waveguide. The modulating element may utilizes electrophoresis techniques or electro-wetting techniques to control the frustration of the TIR of the light.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Many of the patents and applications cited herein recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

U.S. Pat. No. 6,819,471 describes using electrophoretic techniques that are used to frustrate TIR in a two-dimensional display.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 6,118,426; 6,473,072; 6,704,133; 6,710,540; 6,738,050; 6,825,829; 7,030,854; 7,119,759; 7,312,784; 7,705,824; 8,009,348; 8,011,592; 8,064,962; 8,162,212; 8,553,012; 8,973,837; 9,188,829; and 9,197,704; and U.S. Patent Applications Publication Nos. 2002/0090980; 2004/0119681; 2007/0285385; 2013/0176288; 2013/0221112; 2013/0233930; 2013/0235536; 2014/0049808; 2014/0062391; 2014/0206292; and 2016/0035291; and International Application Publication No. WO 00/36560; and (j) Non-electrophoretic displays, as described in U.S. Pat. Nos. 6,241,921; 6,784,953; 6,795,138; 6,914,713; 6,950,220; 7,095,477; 7,182,830; 7,245,414; 7,420,549; 7,471,369; 7,576,904; 7,580,180; 7,850,867; 8,018,643; 8,023,071; 8,282,762; 8,319,759; and 8,994,705 and U.S. Patent Applications Publication Nos. 2005/0099575; 2006/0262249; 2007/0042135; 2007/0153360; 2008/0020007; 2012/0293858; and 2015/0277160; and applications of encapsulation and microcell technology other than displays; see for example U.S. Pat. No. 7,615,325; and U.S. Patent Application Publications Nos. 2015/0005720 and 2016/0012710.

In embodiments in which the modulating element utilizes electrophoresis techniques, the display can include an electrophoretic material layer positioned adjacent the planar surface of the waveguide. The electrophoretic material layer may include a plurality of pixels each containing an electrophoretic fluid in which electrically-charged particles are suspended. The particles translate within the cells between electrodes on opposed sides of the electrophoretic medium in response to an electric field. The position of the particles can be used to modulate the internal reflection of light within the waveguide. For example, light may be internally reflected when it impinges on a face of the waveguide at a location where the particles are absent. In contrast, light may be absorbed and/or scattered by the particles when it impinges on a face of the waveguide at location(s) where the particles are present. The refractive index of the mixture of particles and suspending fluid is higher than that of the waveguide, and thus frustrates the TIR of the light within the waveguide. Absorption or scattering of the light by the particles produces an image point. The image points may be, for example, in the form of white light (e.g., when light is scattered), or the absence of light of some or all visible wavelengths (e.g., when light is absorbed). The collection of image points forms a three-dimensional image that can be seen by a viewer looking into the second end of the waveguide.

In embodiments which utilize electro-wetting techniques, the modulating element can include one or more droplet(s) of a first fluid having a refractive index higher than that of the waveguide (typically a hydrophobic fluid that is dyed or pigmented) in a second, immiscible fluid of lower refractive index than the waveguide (for example, a gas such as air or a hydrophilic liquid such as water). Applied to the surface of the waveguide is a coating whose surface energy changes in response to an applied field. This coating can be patterned or unpatterned and may comprise a polymer such as a fluoropolymer. The first fluid droplet(s) can be contained within one or more cells, for example, in a layer coupled to the waveguide. The position(s) of the droplet(s) can be used to modulate the internal reflection of light within the waveguide. For example, light may be internally reflected when it impinges on the planar face of the waveguide at a location where the droplets are absent. In contrast, light may be absorbed and/or scattered by the fluid when it impinges on the planar face of the waveguide at location(s) where the fluid is present. As in the embodiments that utilize electrophoresis, the refractive index modulation frustrates the TIR of the light and absorption or scattering of the light by the first fluid produces an image point. The image points may be, for example, in the form of white light (e.g., when light is scattered) or the absence of certain or all wavelengths of visible light (e.g., when light is absorbed).

Figure 1:
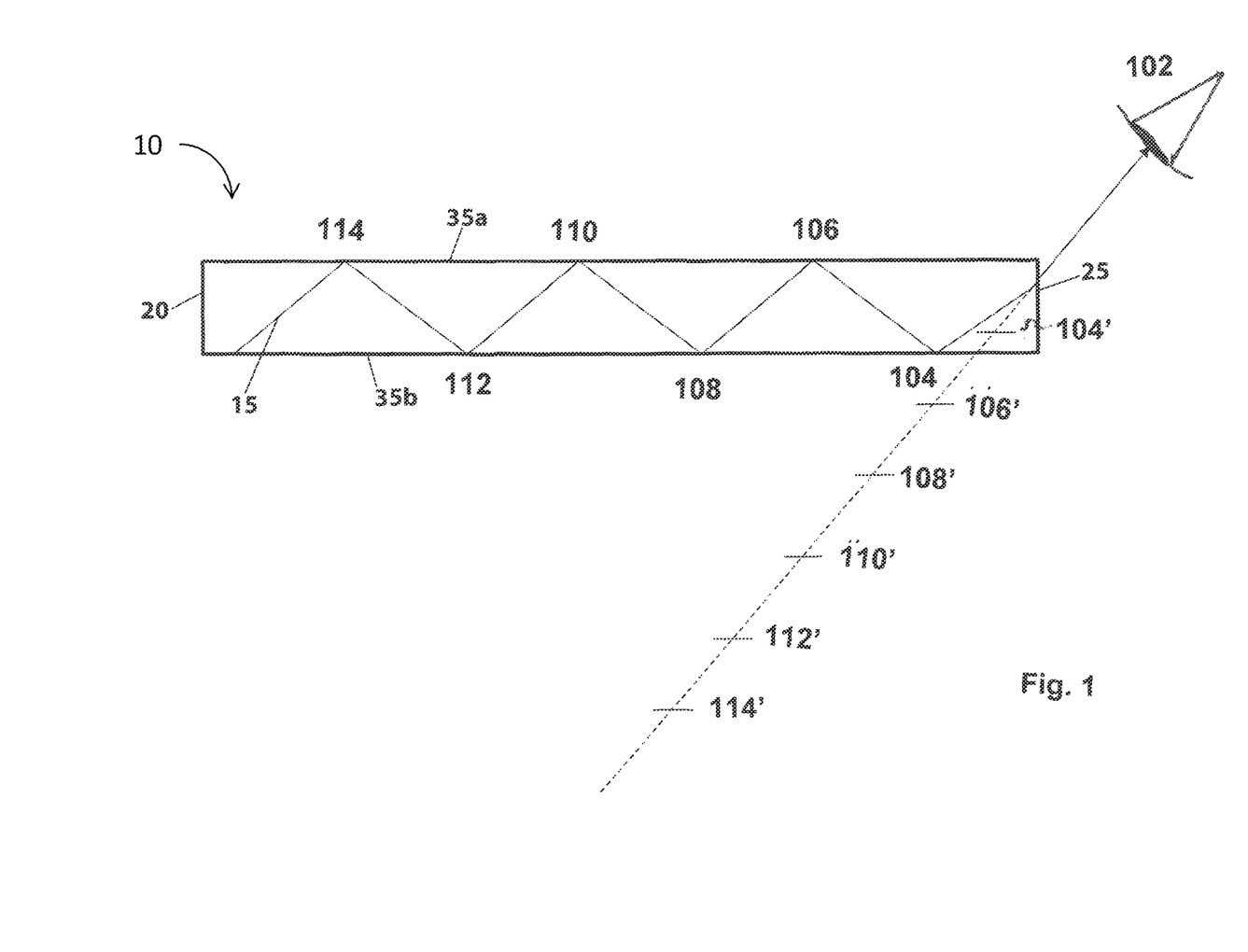
FIG. 1 of the accompanying drawings is a schematic cross-section of a waveguide which can be used in a three-dimensional display of the present invention, and illustrates the manner in which a three-dimensional image is formed.

FIG. 1 is a schematic cross-section through a waveguide (generally designated 10) useable in the present display. Light rays 15 enter the waveguide through a first end 20 and propagate toward a second end 25 from which they exit. As illustrated, the waveguide 10 is prismatic and the light rays are reflected between planar surfaces 35a, 35b. Light rays remain trapped within the waveguide by total internal reflection when the refractive index (or dielectric constant) of the medium external to the waveguide is less than the refractive index of the material from which the waveguide is made, and the angle of incidence of the light with respect to the normal to the planar surface of the waveguide is greater than the critical angle, $$\theta_c = \sin^{-1}(n_1/n_2)$$

where $n_1$ and $n_2$ are the refractive indices of the medium external to the waveguide and the medium of the waveguide itself, respectively. The refractive index of the medium external to the waveguide may be adjusted using electric fields by the presence or absence of particles (in the electrophoretic embodiments) or fluid (in the electro-wetting embodiments), as described above.

As noted above, the TIR of the propagating light can be frustrated at different locations on surfaces 35a, 35b of the waveguide to produce image points at locations 114, 112, 110, 108, 106, 104. A viewer 102 looking through the second end 25 of the waveguide 10 perceives corresponding image points at locations 114', 112', 110', 108', 106', 104' as appearing below the waveguide (e.g., below the plane defined by the bottom surface 35b). The greater the distance of the image point on the waveguide surface is from the second 25, the further below the waveguide the image point is perceived by the viewer. As illustrated, for example, the image point at location 114 is perceived as being the furthest below the waveguide by a viewer (i.e., at location 114') because location 114 is the furthest from end 25. It should be understood that FIG. 1 shows a cross-section of the waveguide and that other cross-sections of the waveguide (e.g., in front of and behind the cross-section shown) can similarly produce a series of image points that are perceived as lying below the waveguide. The combination of all the image points forms a composite three-dimensional image. Frustrating the total internal reflection in a planar waveguide, therefore, can convert images in a two-dimensional plane into a series of receding "step levels" which are below the waveguide. By modulating the total internal reflection using the techniques described herein, it is possible to control how the three-dimensional image is generated.

Figure 2:
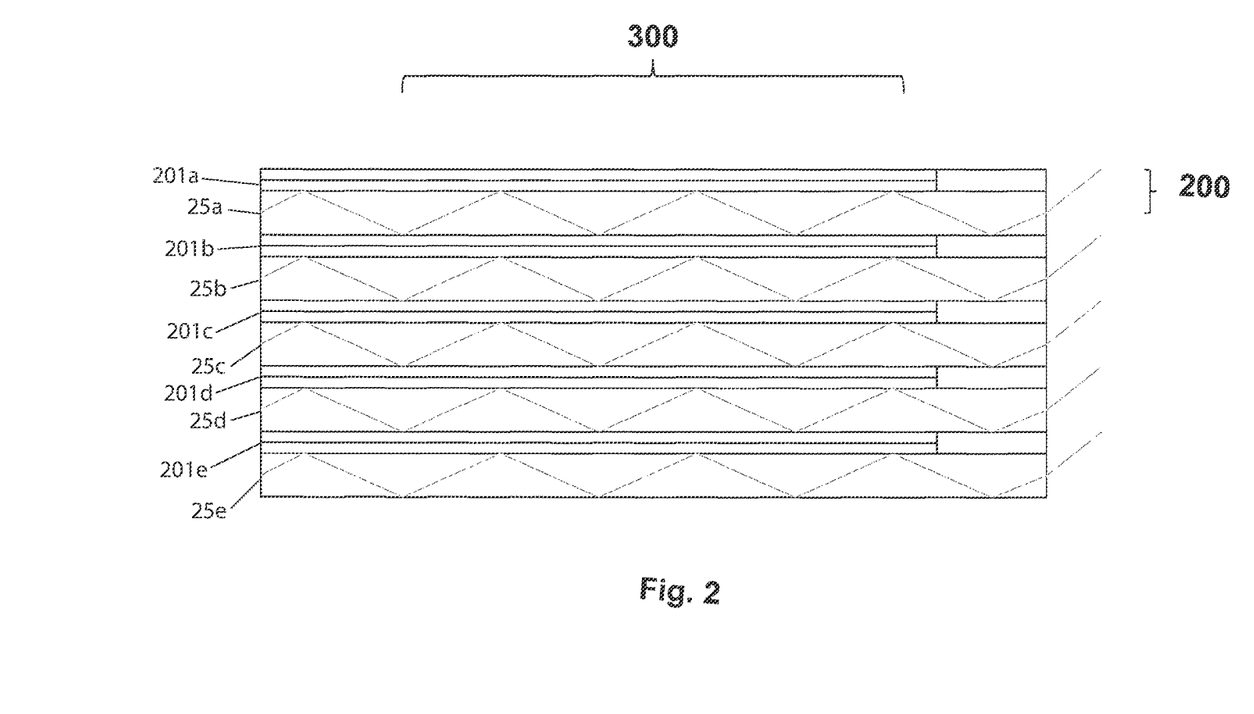
FIG. 2 is a schematic cross-section through a three-dimensional display of the present invention including a stack of waveguides and associated modulating elements.
Figure 3:
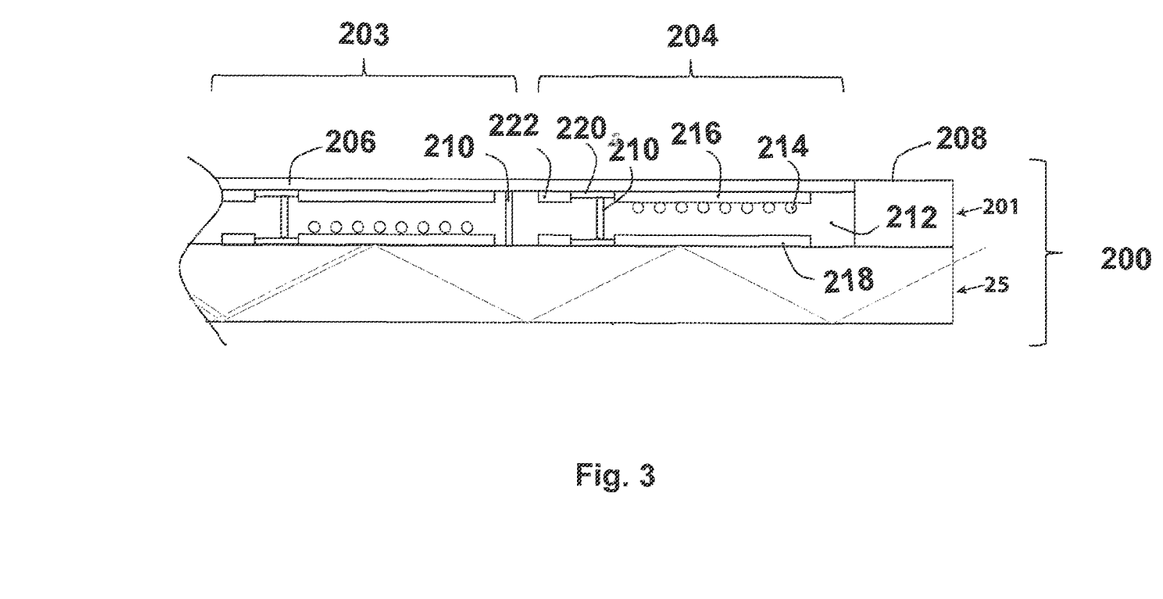
FIG. 3 is a schematic cross-section through a waveguide and electrophoretic modulating element of a display of the present invention.

The three-dimensional display may comprise single or multiple waveguides. FIG. 2 shows a display comprising a stack of waveguides (25a, 25b, 25c, 25d, 25e) and shows a cross-section (not to scale) of a segment 200 of the three-dimensional display 300 that is shown in FIG. 3. As illustrated, each waveguide is coupled to an associated modulating element (201a, 201b, 201c, 201d, 201e). As described further below, the modulating elements may utilize electrophoretic techniques or electro-wetting techniques to modulate total internal light reflection within the waveguides. The three-dimensional image generated may be a composite from of the three-dimensional image provided by each waveguide.

FIG. 2 shows the waveguides arranged in a stack and in parallel. However, other suitable configuration of multiple waveguides are possible. The three-dimensional display may include any suitable number of waveguides. As shown in FIG. 2, the three-dimensional image would not be seen by a viewer looking perpendicularly into the ends of the stack of waveguides. To correct this problem, optical elements (such as, for example, arrays of prismatic elements) could be interposed between the stack of waveguides and the viewer. Films containing such optical elements are well known in the art (for example, Vikuiti brightness enhancing films, available from 3M Corporation, St. Paul, Minn.). Similarly, the depth of the observed image could be increased by interposing one or more lenses between the exit end of the stack of waveguides and the viewer.

The present display may utilize electrophoretic techniques to modulate total internal light reflection within a waveguide. FIG. 3 schematically illustrates a segment of a three-dimensional display that includes an electrophoretic modulating element 201 coupled to waveguide 25. The waveguide comprises a material that is suitable for transmitting light, for example glass or a clear plastic. The waveguide may have a refractive index in the range of 1.5-1.8.

The modulating element 201 includes a series of microcells 212 (each of which as illustrated forms on pixel of the display) that contain an electrophoretic fluid in which electrically charged particles 214 are suspended. As shown, the bottom surfaces of the microcells are defined by an upper, planar surface of the waveguide 25; the top surfaces of the microcells are defined by the lower surface of a substrate 206 that is co-planar with the waveguide; and, the sides of the microcells are defined by sidewalls that extend between the substrate and the waveguide. The substrate may be considerably thinner (e.g., less than 20% of the thickness) than the waveguide. As shown, TIR of the light is frustrated in pixel 203 by the particles present on the waveguide surface. In pixel 204, the light is internally reflected within the waveguide since the particles have been switched away from electrode 218 and the waveguide surface.

In some embodiments, the modulating element may be a separate sheet of electrophoretic material which is attached to the waveguide, for example, using an optically transparent adhesive.

The microcells each include a top electrode 216 and a bottom electrode 218, which may be formed of any suitable conductive material. Bottom electrode 218 should be formed of an optically light-transmissive, preferably transparent, conductive material (e.g., indium tin oxide, ITO) to enable light to pass through it.

One electrode layer may be patterned into elongate row electrodes and the other into elongate column electrodes running at right angles to the row electrodes, and pixels are defined by the intersections of the row and column electrodes to form a passive matrix display. The illustrated embodiment includes pixels 203, 204.

The electrodes 216, 218 may be connected to a drive means (voltage source) through any suitable means. FIG. 3 shows wiring 220 (e.g., traces of electrical materials) that extends from the respective electrodes to respective conductors 222. The conductors may extend across the display (as shown, into the plane of the cross-section) and can connect multiple electrodes to the voltage source.

The voltage source applies a voltage to the electrodes in a controlled manner so as to control the electric field applied to each pixel independently. The voltage may be controlled to provide voltage to the electrodes of selected pixels to frustrate light at desired locations to produce the three-dimensional image.

A spacer 208 is positioned adjacent the pixel (204) that is closest to the viewing end of the waveguide. The spacer can be formed of a material having a similar (e.g., substantially the same) refractive index as the waveguide. The spacer is configured so that it is aligned with a top surface of the cells so that the external surface of the display is planar.

In general, as described above, the electrophoretic fluid has a lower refractive index than the waveguide and the particles. In some embodiments, the electrophoretic fluid has a refractive index below about 1.4. The electrophoretic fluid may be, for example, a highly fluorinated alkane or a hydrocarbon or chlorinated hydrocarbon.

The electrophoretic fluid may include one or more additives to modify certain properties of the fluid. For example, the fluid may include a viscosity modifier that increases the viscosity of the fluid. In some embodiments, it may be beneficial to increase the viscosity of the fluid to limit the settling of particles which may otherwise occur and can lead to performance problems. Suitable viscosity modifiers have been described previously; see, for example, U.S. Pat. No. 7,170,670. In some embodiments, the viscosity modifier is a polymer (e.g., polyisobutylene) that is dissolved or dispersed in the fluid and serves to improve the bistability of the electrophoretic medium. The polymer may have a number average molecular weight in excess of about 20,000. The polymer may be essentially non-absorbing on the particles.

In general, the refractive index of the particles is equal to or, in some cases preferably, higher than that of the waveguide. For example, the refractive index of the particles may be greater than or equal to 1.5; or, in some cases, greater than or equal to 1.7. The refractive index of the particles is also higher than that of the suspending fluid, such that the average refractive index of the particles and the suspending fluid adjacent to the waveguide is equal to or greater than the refractive index of the waveguide, while as mentioned above the refractive index of the suspending fluid is less than that of the waveguide. Suitable particles have been described in patents referenced above. As described above, the particles absorb and/or scatter light. The electrophoretic particles can maintain a stable charge, so that they will respond in a predictable manner to an electric field, and should not stick to surfaces with which they come into contact.

In some embodiments, the particles may be an inorganic pigment such as titania, carbon black, copper chromite or a spinel. Organic pigments may be used, in some embodiments, for example, to provide different colors (i.e., non-white, non-black colors), if desired. The particles may be core-shell particles having a core of one material and a coating of another material. For example, the particles may include a core of a pigment and a polymer coating. The pigment particles may be coated with silica and/or have a polymer chemically bonded to, or cross-linked around the pigment particles. It is generally preferred that the polymer be chemically bonded to the particles. The polymer may comprise from about 1 to about 15 percent by weight; in some cases, from about 2 to about 8 percent by weight, of the pigment particles. The polymer may comprise charged or chargeable groups, for example amino groups. The polymer may also comprise a main chain and a plurality of side chains extending from the main chain, each of the side chains comprising at least about four carbon atoms. The polymer may be formed from an acrylate or a methacrylate. For further details regarding methods of forming polymer coatings on pigment particles see U.S. Pat. Nos. 6,822,782; 7,411,720; and 7,230,750.

In some cases, polymer attachment to the particles may be useful in increasing or decreasing the effective refractive index of the particles. A high refractive index particle may be useful for promoting efficient frustration of TIR, and for this purpose the polymer coating may contain repeating units derived from arsenic-containing monomers.

At least some of the electrically charged particles may be attached to one of the electrodes (e.g., electrode 218) by flexible filaments ("tethers"). Tethered particles have been described, for example, in U.S. Pat. No. 6,819,471. Using tethered particles can increase the uniformity of particle distribution across electrode 218 which can lead to more consistent light absorption and/or scattering across a pixel. The uniformity can be advantageous to performance. The tethers may be formed of polymer chains.

In some embodiments, a high volume fraction of particles may be used. Such high volume fractions may also increase the uniformity of particles that are distributed across electrode 218. For example, in some embodiments, the volume fraction of the particles in the electrophoretic medium may be at least about 50 percent.

The electrophoretic medium may be an encapsulated electrophoretic medium. Alternatively, the spacer walls surrounding and dividing the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760, which is incorporated herein by reference.

Although in FIGS. 1-3 the electrophoretic motion is shown as perpendicular to the plane of the waveguide, it will be clear to one skilled in the art that motion of pigments parallel to the waveguide may also be employed.

Figure 4:
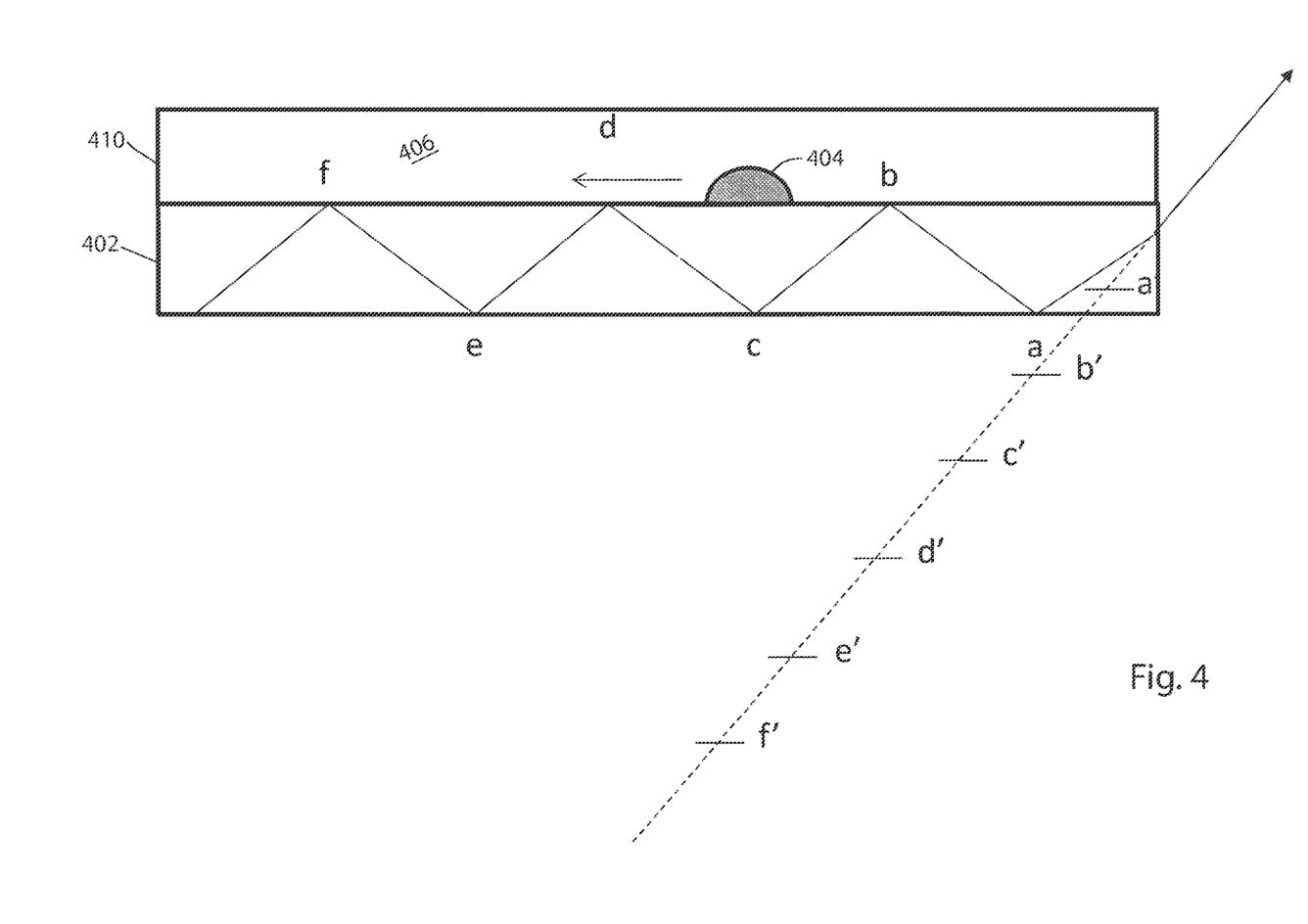
FIG. 4 is a schematic cross-section through a waveguide and electro-wetting modulating element of a display of the present invention.

The displays of the present invention may also utilize electro-wetting techniques to modulate total internal light reflection within a waveguide. FIG. 4 schematically illustrates an embodiment in which an electro-wetting modulating element 410 is coupled to a waveguide 402. The electro-wetting modulating element includes one, or typically more than one, fluid droplet 404 that can be moved to different positions on the waveguide face by electro-wetting techniques in response to an electric field. The position of the droplet(s) can be used to modulate the internal reflection of light within the waveguide. The light is reflected at positions on the faces of the waveguide where one or more droplets are absent and light is absorbed and/or scattered at positions on the faces of the waveguide where the droplets are present.

In general, the refractive index of the fluid droplet(s) is equal to or, in some cases preferably, higher than that of the waveguide. For example, the refractive index of the fluid droplet(s) may be greater than or equal to 1.5; or, in some cases, greater than or equal to 1.8. As described above, the fluid droplet(s) absorb and/or scatter light. The fluid droplets need to respond to an electric field so that they may be moved to desired locations by an applied field. The fluid droplet(s) comprise an oil, which may include a colored dye to display color if desired. Suitable fluids have been described, for example, in U.S. Pat. No. 7,420,549.

The modulating element includes a reservoir 406 in which the droplets are contained. The reservoir may contain at least two immiscible fluids, one of which forms the droplet phase, the other of which forms a continuous phase. The mixture of fluids covers the surface of the waveguide and may substantially fill the reservoir. The fluid forming the continuous phase generally has a refractive index which is less than the refractive index of the waveguide to enable light to be internally reflected within the waveguide in locations where the continuous phase fluid is present. or example, the continuous phase fluid can have a refractive index below about 1.3, and may for example be water.

Electro-wetting modulating elements may include a number of pixels similar to the pixels described above in connection with the electrophoretic modulating elements. For example, electrical fields may be applied to the pixels using electrodes on opposed sides of the modulating element. As described above, the electrode in contact with the waveguide should be formed of an optically transparent conductive material (e.g., indium tin oxide, ITO) to enable light to pass through it.

The electrodes may be connected to a voltage source through any suitable means. The voltage source applies a voltage to the electrodes in a controlled manner. The voltage may be controlled to provide voltage to the electrodes of selected pixels to frustrate light at desired locations to produce the three-dimensional image.

Displays of the present invention may combine electrophoretic and electro-wetting modulating techniques. For example, a single waveguide may have electro-wetting or electrophoretic pixels on both sides of a planar waveguide. Furthermore, a waveguide may have electro-wetting pixels on one side and electrophoretic pixels on the other side.

In multiple waveguide arrangements, all the waveguides may be of the same type of they may be any combination of different waveguides including any combination of electrophoretic and electro-wetting waveguides and waveguides combining electrophoretic and electro-wetting pixels. The different waveguides may also be of different colors as well as multiple color waveguides, different haziness, opacity and reflectance. By combining different color waveguides, it may be possible to have a full color three-dimensional display. Alternatively, a color display might be produced by using colored pigments or by illuminating a monochrome display with light of different colors, as is well known in the art.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A three-dimensional display comprising:
a waveguide having first and second ends and configured such that light enters through the first end and propagates through the waveguide toward the second end, the waveguide having a planar face intermediate the first and second ends;
an electrophoretic modulating element disposed adjacent the planar face and comprising a fluid in which electrically-charged particles are dispersed, the electrophoretic modulating element comprising a plurality of pixels disposed at differing distances from the second end of the waveguide, the particles at each pixel being movable between a first position adjacent the planar surface, thereby causing light absorption and/or light scattering at the pixel, and a second position spaced from the planar surface, thereby permitting propagation of light along the waveguide; and
a driving means configured to control the electric field applied to each pixel independently,
whereby the pixels create image points so that light emerging from the second end of the waveguide forms a three-dimensional image to a viewer looking through the second end of the waveguide.

2. The display of claim 1 wherein the electrically charged particles and the fluid are confined within a plurality of capsules or microcells.

3. The display of claim 1 wherein the electrically charged particles and the fluid are present as a plurality of discrete droplets surrounded by a continuous phase comprising a polymeric material.

4. The display of claim 2, wherein the microcells are delimited by the planar surface, a surface of a substrate co-planar with the planar surface and sidewalls that extend between the planar surface and the surface of the substrate.

5. The display of claim 4, wherein each microcell comprises a first electrode on the planar surface and a second electrode on the surface of the substrate.

6. The display of claim 1 comprising a plurality of waveguides stacked so that the planar faces of the waveguides lie in parallel planes, and a plurality of modulating elements each coupled to one associated waveguide.

7. The display of claim 1, wherein the fluid has a lower refractive index than the waveguide and the electrically-charged particles have a refractive index equal to or greater than the waveguide.

8. A three-dimensional display comprising:
a waveguide having first and second ends and configured such that light enters through the first end and propagates through the waveguide toward the second end, the waveguide having a planar face intermediate the first and second ends;
an electrowetting modulating element disposed adjacent the planar face and comprising a plurality of pixels disposed at differing distances from the second end of the waveguide, each pixel comprising at least one fluid droplet movable between a first position causing light absorption and/or light scattering at the pixel, and a second position permitting propagation of light along the waveguide; and a driving means configured to control the electric field applied to each pixel independently, whereby the pixels create image points so that light emerging from the second end of the waveguide forms a three-dimensional image to a viewer looking through the second end of the waveguide.

9. The display of claim 8 wherein said fluid droplets comprise a first fluid and each pixel further comprises a second fluid immiscible with the first fluid.

10. The display of claim 8 wherein the fluid droplets are confined within a plurality of microcells.

11. The display of claim 10, wherein the microcells are delimited by the planar surface, a surface of a substrate co-planar with the planar surface and sidewalls that extend between the planar surface and the surface of the substrate.

12. The display of claim 11, wherein each microcell comprises a first electrode on the planar surface and a second electrode on the surface of the substrate.

13. The display of claim 8 comprising a plurality of waveguides stacked so that the planar faces of the waveguides lie in parallel planes, and a plurality of modulating elements each coupled to one associated waveguide.

14. A method of generating a three-dimensional image, the method comprising:

providing a waveguide having first and second ends and a planar face intermediate the first and second ends;

providing an electrophoretic modulating element disposed adjacent the planar face and comprising a fluid in which electrically-charged particles are dispersed, the electrophoretic modulating element comprising a plurality of pixels disposed at differing distances from the second end of the waveguide, the particles at each pixel being movable between a first position adjacent the planar surface, thereby causing light absorption and/or light scattering at the pixel, and a second position spaced from the planar surface, thereby permitting propagation of light along the waveguide;

directing light into the first end of the waveguide, thereby causing the light to propagate through the waveguide towards the second end;

controlling the electric field applied to each pixel independently, thereby causing light absorption and/or light scattering at at least one pixel where the particles are in the first position and propagation of light at at least one pixel where the particles are in the second position, thereby causing light to emerge from the second end of the waveguide and to form a three-dimensional image of image points created by the pixels.

15. The method of claim 14 comprising providing a plurality of waveguides stacked so that the planar faces of the waveguides lie in parallel planes, and a plurality of modulating elements each coupled to one associated waveguide.

* * * * *